United States Patent
Morita et al.

(12)

(10) Patent No.: US 6,303,844 B1
(45) Date of Patent: *Oct. 16, 2001

(54) METHOD OF DECONTAMINATING MEDIUM CONTAINING POLYCHLORINATED BIPHENYLS OR DIOXINS

(75) Inventors: Masatoshi Morita, Tsukuba; Takeshi Yamazaki, Sakura; Takashi Kamiya, Sakura; Hiroyuki Takano, Sakura; Osamu Fuse, Sakura; Eichi Manabe, Sakura; Toshihisa Maruta, Sakura, all of (JP)

(73) Assignee: Taiheiyo Cement Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,297

(22) Filed: Dec. 8, 1999

(30) Foreign Application Priority Data

Dec. 9, 1998 (JP) .................................... 10-350053
Dec. 11, 1998 (JP) .................................... 10-353652

(51) Int. Cl.$^7$ ................................. A62D 3/00; C02F 3/32
(52) U.S. Cl. ............................................. 588/207; 210/602
(58) Field of Search .................................. 588/205, 206, 588/207; 75/711, 712; 210/602

(56) References Cited

U.S. PATENT DOCUMENTS

| | | | | |
|---|---|---|---|---|
| 4,532,028 | * | 7/1985 | Peterson ................................. | 208/262 |
| 5,055,196 | * | 10/1991 | Darian et al. ........................ | 210/638 |
| 5,240,570 | * | 8/1993 | Chang et al. ......................... | 204/130 |
| 5,785,735 | * | 7/1998 | Raskin et al. ........................... | 75/711 |
| 5,917,117 | * | 6/1999 | Ensley et al. .......................... | 75/711 |
| 5,928,406 | * | 7/1999 | Salt et al. ............................... | 75/712 |
| 6,159,270 | * | 12/2000 | Raskin et al. .......................... | 75/711 |

OTHER PUBLICATIONS

Walia et al., Biochemical and genetic characterization of soil bacteria degrading polychlorinated biphenyl, Oct. 31, 1987, Hazardous Waste Detection, Control, Treatment p. 1621–1632.

Mackova et al., Biodegradation of Polychlorinated Biphenyls by Plant Cells, 1997, International Biodeterioration and biodegradation vol. 39 (4), p. 317–324.

Kas et al., Perspectives in Biodegradation of Alkanes and PCBs, 1997, Pure and Applied Chemistry vol., 69 (11), p. 2357–2369.

Burkhard et al., Analytical Procedure for the Estimation of Polychlorinated Biphenyl Transformed by Plant Tissue Cultures, Oct. 1997, Analytical Communications vol. 34, p. 287–290.

Kirk–Othmer, "Surfactants", 1997, Encyclopedia of Chemical Technology, p. 506.*

Pfafflin et al., "PCBs and Associated Aromatics, The PCB remediation of soils", 1998, Encyclopedia of Environmental Science and Engineering, p. 1025–1028.*

* cited by examiner

*Primary Examiner*—Steven P. Griffin
*Assistant Examiner*—Eileen E. Nave
(74) *Attorney, Agent, or Firm*—Oblon, Spivak, McClelland, Maier & Neustadt, P.C.

(57) ABSTRACT

A method of decontaminating a medium containing polychlorinated biphenyls (PCBs) or dioxins is disclosed. The contaminated medium is brought into contact with hairy roots derived through introduction of an Ri plasmid from *Agrobacterium rhizogenes* into a plant capable of absorbing, or absorbing and decomposing PCBs or dioxins, or is brought into contact with regenerated plantlets derived from the hairy roots, to thereby cause the hairy roots or regenerated plantlets to absorb, or absorb and decompose PCBs or dioxins.

27 Claims, No Drawings

METHOD OF DECONTAMINATING MEDIUM CONTAINING POLYCHLORINATED BIPHENYLS OR DIOXINS

BACKGROUND OF THE INVENTION

1. Field of the Invention

The present invention relates to a method of efficiently decontaminating a medium which contains polychiloinated biphenyls (hereinafter abbreviated as PCBs) or polychlorinated dibenzo-p-dioxins and polychlorinated dibenzofurans (hereinafter abbreviated as dioxins), such as soil or a lake or marsh contaminated with PCBs or dioxins, through utilization of plants' capability of absorbing, or absorbing and decomposing, PCBs or dioxins.

2. Description of the Related Art

Since PCBs are chemically very stable and exhibit excellent electrical insulating properties, they have been widely used in, for example, insulating oils of capacitors or transformers, thermal media, machine oils, and pressure-sensitive paper.

Since recognition of biological toxicity of PCBs (for example, in the Kanemi Oil case in Japan), production of PCBs has been regulated. However, contamination with PCBs has spread globally, and the effect of PCBs has lasted over a long period of time.

Recent reports have pointed out the toxicity of PCBs as endocrine disrupters and that even a very small amount of PCBs has an adverse effect on the environment.

PCB decomposition processes approved in Japan under the Waste Disposal and Public Cleansing Law are an incineration process, a base-catalyzed decomposition (BCD) process, a chemical extraction-decomposition process (DMI/NaOH process), a potassium tertiary butoxide process (t-BuOK process), a catalitic hydrogenation-dechlorination process (+t-BuOK process), and a supercritical water oxidation process (SCWO process).

Such chemical or physical decomposition processes exhibit relatively high decomposition efficiency, but conventionally involve high processing cost. Also, these processes are suited for decontaminating a contaminated medium of high contamination concentration, but are not suited for practical decontaminating of a large-scale, contaminated medium of low contamination concentration.

Meanwhile, dioxins, which are very toxic, are chemically relatively stable and thus are not easily decomposed. Since dioxins are soluble in oils and fats, once food contaminated with dioxins is taken into the human body, dioxins are absorbed by the organs. Since ingested dioxins are hardly egested, dioxins reportedly not only keep accumulating within the human body but are also transmitted from a mother to a fetus via the womb.

In recent years, as the action of dioxins as endocrine disrupters has become clear, the effect of dioxins on future generations has become of serious concern.

Dioxins are generated mainly in an incineration process at a temperature of about 300–850° C., as in a refuse incineration furnace, and are released into the atmosphere in the form of exhaust gas. Thus-released dioxins are primarily accumulated in, for example, soil, lakes and marshes, and rivers. Since measures against dioxin sources have begun to work, fresh generation of dioxins tends to be suppressed. However, dioxins in the soil have been left accumulated over a long period of time without deterioration or decomposition, so that the soil contaminated with dioxins has become a secondary source of dioxins.

Incineration at high temperature is the most effective process for decomposing dioxins. This incineration process is not suited for treating a large amount of contaminated media and involves considerable treatment. According to a conventional method for disposing of, for example, contaminated soil, the contaminated soil is excavated and relocated to a disposal yard, where the contaminated soil is filled into an excavated hole and covered with sealing soil. This method is conventionally employed, since a relatively large amount of contaminated media can be disposed of.

This filling-up method is a tentative one—a medium contaminated with dioxins is merely moved from one location to another. The relocated, contaminated medium may raise another environmental contamination problem in the new location. Efficient, perpetual measures to treat dioxins have not been achieved.

SUMMARY OF THE INVENTION

An object of the present invention is to provide a method of efficiently decontaminating soil or a lake or marsh contaminated with PCBs or dioxins; particularly, a medium contaminated widely and at low concentration with PCBs or dioxins, through utilization of plants' capability of absorbing, or absorbing and decomposing PCBs or dioxins.

The present inventors studied hairy roots derived through infection with *Agrobacterium rhizogenes* (hairy-root disease bacteria), or soil bacteria. The hairy roots are derived through incorporation into a plant-cell chromosome of the T-DNA region of the Ri plasmid present in the body cell of *Agrobacterium rhizogenes* followed by development thereof. As compared to common roots, which cannot survive unless special measures are taken, the hairy roots can survive in a common sterile medium and grow abundantly. Even when *Agrobacterium rhizogenes* is completely sterilized by means or, for example, antibiotics, the hairy roots grow abundantly without losing their properties. The hairy roots can regenerate into plantlets under appropriate culture conditions. The regenerated plantlets are characterized by development of a root system.

The present inventors reached the inventive concept of decontaminating soil or a lake or marsh contaminated with PCBs or dioxins through utilization of the abundantly growing hairy roots or regenerated plantlets derived from the hairy roots and through reinforcement of their inherent capability of absorbing, or absorbing and decomposing PCBs or dioxins. On the basis of this idea, the inventors conducted various experiments and achieved the present-invention.

According to a method of the present invention of decontaminating a medium containing PCBs or dioxins, the contaminated medium is brought into contact with hairy roots derived through introduction of an Ri plasmid from *Agrobacterium rhizogenes* into a plant capable of absorbing, or absorbing and decomposing PCBs or dioxins, or is brought into contact with regenerated plantlets derived from the hairy roots, to thereby cause the hairy roots or regenerated plantlets to absorb, or absorb and decompose PCBs or dioxins.

The decontaminating method of the present invention not only is efficient but also enables low-cost treatment, plain treatment not involving excavation, on-site treatment not involving relocation of contaminated soil, and perpetual treatment capable of extinguishing PCBs or dioxins. Planting prevents diffusion of soil contaminated with PCBs or dioxins which would otherwise take place through outflow or scattering of surface soil; i.e., contaminants can be decomposed or cleaned up while revegetation is carried out. Even when PCBs or dioxins are not satisfactorily decomposed, undecomposed PCBs or dioxins are absorbed into plants to be condensed and fixed therein, thereby preventing diffusion of contamination. The plants may be reaped and incinerated.

DESCRIPTION OF THE PREFERRED EMBODIMENTS

As used herein, the expression "medium containing PCEs or dioxins" refers to a contaminated medium, such as soil, a lake or marsh, or a river contaminated with PCBs or dioxins.

A plant used in the present invention is not particularly limited so long as it has the capability of absorbing, or absorbing and decomposing PCBs or dioxins. Examples of planes capable of absorbing, or absorbing and decomposing PCBs include plants belonging to Solanaceae, Cruciferaa, or Umbelliferae; specifically, *Atropa belladonna, Wasabia japonica*, and *Armoracia rusticana*. Particularly, *Atropa belladonna* is preferred. Examples of plants capable of absorbing, or absorbing and decomposing dioxins include plants belonging to Solanaceae, Cruciferae, Umbelliferae, Chenopodiaceae, Leguminiosae, Compositae, or Saxifragaceae. Among those plants, those belonging to Cruciferae are preferred. *Atropa belladonna* is particularly preferred. These plantlets may be used in their original form. Alternatively, a portion of a plantlet, such as seeds, hairy roots, root tissue, or cells, may be used.

*Agrobacterium rhizogenes* used in the present invention for introduction of an Ri plasmid into a plant is not particularly limited. *Agrobacterium rhizogenes* is available from, for example, Institute for Fermentation, Osaka.

A method of introducing an Ri plasmid into a plant is not particularly limited. Examples of the method include direct inoculation of *Agrobacterium rhizogenes*, electrical simulation, and a leaf disk process, which may be selected as appropriate.

A plant into which an Ri plasmid is introduced is cultivated in an appropriate culture medium so as to derive hairy roots. The hairy roots which have undergone bacterial elimination proliferate actively even in a culture medium that does not contain plant hormones, enabling infinite proliferation. Also, the hairy roots can be regenerated into plantlets under appropriate culture conditions.

A medium containing PCBs or dioxins may be brought into contact with the above-mentioned hairy roots or regenerated plantlets derived from the hairy roots, by appropriate means. For example, the hairy roots or regenerated plantlets may be planted or immersed in soil or water contaminated with PCBs For dioxins. The hairy roots or regenerated plantlets absorb, or absorb and decompose PCBs or dioxins contained in the medium, thereby reducing the concentration of PCBs or dioxins contained in the contaminated soil or water.

Preferably, dimethyl sulfoxide and/or a surfactant is added to the medium containing PCBs or dioxins before the medium is brought into contact with the hairy roots or regenerated plantlets. Such an additive accelerates absorption, or absorption and decomposition of PCBs or dioxins effected by the hairy roots or regenerated plantlets. Such a surfactant is not particularly limited, but may be nonionic, anionic, cationic, amphoteric, natural, or synthetic. A surfactant that less affects the growth of the hairy roots or regenerated plants is preferred.

Examples of nonionic surfactants include glycerin fatty acid esters, propylene glycol fatty acid esters, sorbitan fatty acid esters, polyoxyethylene sorbitan fatty acid esters, polyoxyethylene sorbitol tetraoleate, polyoxyethylene alkyl ethers, polyoxyethylene polyoxypropylene glycol, polyoxyethylene polyoxypropylene alkyl ethers, polyethylene glycol fatty acid esters, castor oil-modified polyoxyethylene, hardened castor oil-modified polyoxyethylene, polyglycerin fatty acid esters, and alkyl glycosides. Examples of anionic surfactants include fatty acid salts, polyoxyalkylene alkyl ether acetate salts, alkylsulfate salts, polyoxyalkylene alkyl ether sulfate salts, sulfosuccinic acid surfactants, sulfosuccinamate surfactants, polyoxyalkylene alkylamide ether sulfate salts, monoglyceride sulfate salts, olefinesulfonate salts, alkanesulfonate salts, acylated isethionate salts, acylated amino acid salts, alkylphosphate salts, and polyoxyalkylene alkyl ether phosphate salts. Examples of cationic surfactants include dialkyldimethylammonium salts, alkyltrimethylammonium salts, alkyldimethylbenzylammonium salts, benzalkonlum salts, benzethonium salts, alkylpyridinium salts, and alkylisoquinolinium salts, and surfactants derived from natural products such as lecithin. Examples of amphoteric surfactants include amidoamino acid surfactants, carbobetaine surfactants, sulfobetain surfactants, amidosulfobetain surfactants, imidazoliniumbetain surfactants, amino acid betaine surfactants, and phosphobetaine surfactants. Specific examples include alkyldiaminoethylglycine salts, $\beta$-alkylaminopropionic acid salts, and 2-alkyl-N-carboxymethyl-N-hydroxyethylimidazoliniumbetaine.

Among those surfactants, a nonionic surfactant is particularly preferred. The surfactants may be used singly or in combination. Dimethyl sulfoxide or a surfactant may be added to the medium containing PCBs or dioxins in an amount of 0.005–1.0% by weight, preferably 0.01–0.1% by weight.

EXAMPLES

The present invention will next be described in detail by way of example, which should not be construed as limiting the invention.

Example 1

A. Derivation of Hairy Roots of *Atropa Belladonna*
(1) Preparation of *Atropa Belladonna* Material Seeds of *Atropa belladonna* were washed with a neutral detergent and were then rinsed with water. The seeds were immersed for 10 minutes in an aqueous solution of sodium hypochlorite having an effective chlorine concentration of 1% to thereby sterilize seed surface. The seeds were washed twice in sterilized water. Subsequently, the seeds were planted and cultivated in a ½ (macro) MS culture medium (Murashige and Skoog's Medium; Murashige T. and Skoog F., A revised medium for rapid growth and bioassays with tabacco tissue cultures., Physiol. Plant. 15: 473–497, 1962).
(2) Inoculation of *Agrobacterium Rhizogenes*

A seedling (hypocotyl) from sterile seeding was cut to a length of about 3 cm. The thus-cut hypocotyl was stuck into a culture medium such that the root-side end faces up while the leaf-side end is stuck in the medium (upside down). *Agrobacterium rhizogenes* cultivated in agar was taken by means of a platinum loop and was then applied to the upper cut end of the hypocotyl. Then, the hypocotyl was subjected to cultivation in the dark at a temperature of 25° C. Two weeks later, hairy roots (adventitious roots) differentiated from the cut end.
(3) Elimination of Bacteria from Hairy Roots Agar was prepared by adding a cephalosporin (Claforan, product of Hoechst Japan Ltd.) in an amount of 500 mg/L to a ½ (macro) MS culture medium. The above-obtained hairy roots were placed on the agar, followed by cultivation in the dark at a temperature of 25°C. for the purpose of bacterial elimination. This cultivation was repeated 5 times at intervals of one week, achieving complete bacterial elimination.
(4) Cultivation of Hairy Roots Bacteria-eliminated hairy roots having a length of about 2 cm, 3 hairy roots per petri dish, were cultured in a ½ (macro) MS culture medium. Subculturing was carried out every four weeks.

B. Absorption and Decomposition of PCBs by Hairy Roots of *Atropa Belladonna*

(1) PSBs Reagent

Through use of KANECHLOR 300 (KC300, product of Kaneka Corporation) as a PCBs reagent, a dimethyl sulfoxide (DMSO) solution having a PCBs concentration of 20,000 mg/L was prepared.

(2) Preliminary Cultivation of Hairy Roots and Subsequent Cultivation in PCBs-added Culture Medium Graded amounts of a ½ (macro) MS culture medium (100 mL) were placed in a 300 mL Erlenmeyer flask. Hairy roots (0.2 g) chopped into pieces having a length of about 2 cm were placed in the flask and were subjected to 2-week preliminary cultivation in the dark at a temperature of 25° C. while being shaken (100 rpm). The DMSO solution having a PCBs concentration of 20,000 mg/L prepared above in (1) was placed in another 300 mL Erlenmeyer flask that contains a ½ (macro) MS culture medium (100 mL), such that the PCBs concentration of the medium becomes 10 mg/L. In this PCBs-added culture medium, the hairy roots which had undergone the above preliminary cultivation were planted to prepare two kinds of samples—one underwent another 1-week cultivation and the other underwent another 3-week cultivation.

(3) Analysis for PCBs

After completion of cultivation of the hairy roots in the PCBs-added culture medium, the samples were analyzed by means of GC-MS for the amount of PCBs remaining in the culture medium and the amount of PCBs absorbed and accumulated in the hairy roots. The results are shown in Table 1.

Example 2

Hairy roots of *Atropa belladonna* obtained in a manner similar to that of Example 1 were subjected to preliminary cultivation under the same conditions as those in Example 1. The DMSO solution having a PCBs concentration of 20,000 mg/L mentioned above in Example 1 was placed in another 300 mL Erlenmeyer flask that contains a ½ (macro) MS culture medium (100 mL), such that the PCBs concentration or the medium becomes 100 mg/L. Further, Tween20 (polyoxyethylene sorbitan monolaurate), which is a non-ionic surfactant, was added into the flask such that the concentration thereof becomes 0.01% by weight. In this PCBs-added culture medium, the hairy roots which had undergone the above preliminary cultivation were planted to prepare two kinds of samples—one underwent another 1-week cultivation and the other underwent another 3-week cultivation.

After completion of cultivation of the hairy roots in the PCBs-added culture medium, the samples were analyzed by means of GC-MS for the amount of PCBs remaining in the culture medium and the amount of PCBs absorbed and accumulated in the hairy roots. The results are shown in Table 1.

Comparative Example 1

In the pre-culturing step in Example 1, instead of hairy roots of *Atropa belladonna* (0.2 g), *Atropa belladonna* was sterilely seeded and was cultivated without inoculation of *Agrobacterium rhizogenes*. The resulting seedling roos were chopped into pieces having a length of about 2 cm. The chopped roots (0.2 g) were subjected to preliminary cultivation in a manner similar to that of Example 1. The DMSO solution having a PCBs concentration of 20,000 mg/L mentioned above in Example 1 was placed in another 300 mL Erlenmeyer flask that contains a ½ (macro) MS culture medium (100 mL), such that the PCBs concentration of the medium becomes 10 mg/L. In this culture medIum, the roots which had undergone the above preliminary cultivation were planted to prepare two kinds of samples—one underwent another 1-week cultivation and the other underwent another 3-week cultivation.

After completion of cultivation of the roots in the PCBs-added culture medium, he samples were analyzed by means of GC-MS for the amount of PCBs remaining in the culture medium and the amount of PCBs absorbed and accumulated in the roots. The results are shown in Table 1.

TABLE 1

|  | Weight of roots (g) | | Percentage to added PCBs (%) | | | |
| --- | --- | --- | --- | --- | --- | --- |
| | | | 1-week cultivation | | 3-week cultivation | |
| | Initial | 1-week cultivation | 3-week cultivation | PCBs in medium | PCBs in roots | PCBs in medium | PCBs in roots |
| Example 1 | 0.20 | 1.16 | 1.67 | 58 | 40 | 14 | 64 |
| Example 2 | 0.20 | 0.31 | 0.78 | 60 | 17 | 19 | 29 |
| Com. Example 1 | 0.20 | 0.28 | 0.43 | 81 | 16 | 68 | 25 |

As seen from Table 1, the hairy roots derived through introduction of an Ri plasmid from *Agrobacterium rhizogenes* into *Atropa belladonna* absorb and decompose a considerably large amount of PCBs as compared to the roots of natural *Atropa belladonna*.

Example 3

Hairy roots were derived from *Brassica juncea* var. *multiceps*, *Brassica juncea* var. *cernua*, *Brassica juncea* var. *rapa*, and *Daucus carota* according to the method of Example 1.

Graded amounts of a ½ (macro) MS culture medium (100 mL) were placed in a 300 mL Erlenmeyer flask. Hairy roots (0.2 g) chopped into pieces having a length of about 2 cm were placed in the flask and were subjected to 2-week preliminary cultivation in the dark at a temperature of 25° C. while being shaken (100 rpm) .The DMSO solution having a PCBs concentration of 20,000 mg/L as prepared in Example 1 was placed in another 300 mL Erlenmeyer flask that contains a ½ (macro) MS culture medium (100 mL), such that the PCBs concentration of the medium becomes 10 mg/L. In this PCBs-added culture medium, the hairy roots which had undergone the above preliminary cultivation were planted to prepare the respective kinds of samples. The samples were cultivated for another 5 weeks.

After completion of cultivation of the hairy roots in the PCBs-added culture medium, the samples were analyzed by means of GC-MS for the amount of PCBs remaining in the culture medium and the amount of PCBs absorbed and accumulated in the hairy roots. The results are shown n Table 2.

Example 4

The E)MSO solution having a PCBs concentration of 20,000 mg/L mentioned above in Example 1 was placed in a 300 mL Erlenmeyer flask that contains a ½ (macro) MS culture medium (100 mL), such that the PCBs concentration of the medium becomes 10 mg/L. Further, Tween20 (polyoxyethylene sorbitan monolaurate), which is a non-ionic surfactant, was added into the flask such that the concentration thereof becomes 0.01% by weight. In this PCBs-added culture medium, the hairy roots which had been prepared in a manner similar to that of Example 3 were planted to prepare the respective kinds of samples. The samples were cultivated for another 5 weeks.

After completion of cultivation of the hairy roots in he PCBs-added culture medium, the samples were analyzed by means of GC-MS for the amount of PCBs remaining in the culture medium and the amount of PCBs absorbed and accumulated in the hairy roots. The results are shown in Table 2.

Comparative Example 2

*Brassica juncea* var. *multiceps*, *Brassica juncea* var. *cernua*, *Brassica juncea* var. *rapa*, and *Daucus carota* were sterilely seeded and were cultivated without inoculation of *Agrobacterium rhizogenes*. The resulting corresponding seedling roots were chopped into pieces having a length of about 2 cm. The resultant corresponding chopped roots (0.2 g) were subjected to preliminary cultivation in a manner similar to that of Example 3. The DMSO solution having a PCBs concentration of 20,000 mg/L mentioned above in Example 1 was placed in another 300 mL Erlenmeyer flask that contains a ½ (macro) MS culture medium (100 mL), such that the PCBs concentration of the medium becomes 10 mg/L. In this culture medium, the corresponding roots which had undergone the above preliminary cultivation were planted to prepare the respective kinds of samples. The samples were cultivated for another 5 weeks.

After completion of cultivation of the roots in the PCBs-added culture medium, the samples were analyzed by means of GC-MS for the amount of PCBs remaining in the culture medium and the amount of PCBs absorbed and accumulated in the roots. The results are shown in Table 2.

TABLE 2

| | | Weight of roots (g) | | Percentage to added PCBS (%) 5-week cultivation | |
|---|---|---|---|---|---|
| | | Initial | 5-week cultivation | PCBs in medium | PCBs in roots |
| Example 3 | Brassica juncea var. multiceps | 0.20 | 2.67 | 42.1 | 57.9 |
| | Brassica juncea var. cernua | 0.20 | 2.43 | 33.0 | 67.0 |
| | Brassica juncea var. rapa | 0.20 | 0.92 | 37.5 | 62.5 |
| | Daucus carota | 0.20 | 2.88 | 31.2 | 68.8 |
| Example 4 | Brassica juncea var. multiceps | 0.20 | 3.14 | 5.1 | 94.9 |
| | Brassica juncea var. cernua | 0.20 | 2.58 | 4.2 | 95.8 |

TABLE 2-continued

| | | Weight of roots (g) | | Percentage to added PCBS (%) 5-week cultivation | |
|---|---|---|---|---|---|
| | | Initial | 5-week cultivation | PCBs in medium | PCBs in roots |
| | Brassica juncea var. rapa | 0.20 | 0.83 | 21.3 | 78.7 |
| | Daucus carota | 0.20 | 2.83 | 18.8 | 81.2 |
| Com. Example 2 | Brassica juncea var. multiceps | 0.20 | 0.31 | 83.3 | 16.7 |
| | Brassica juncea var. cernua | 0.20 | 0.28 | 78.9 | 21.1 |
| | Brassica juncea var. rapa | 0.20 | 0.29 | 80.2 | 19.8 |
| | Daucus carota | 0.20 | 0.28 | 89.6 | 10.4 |

As seen from Table 2, the hairy roots derived through introduction of an Ri plasmid from *Agrobacterium rhizogenes* into the plants belonging to Cruciferae and Umbelliferae absorb and decompose a considerably large amount of PCBs as compared to the roots of the natural counterparts of these plants.

Example 5

The DMSO solution having a PCBs concentration of 20,000 mg/L as prepared in Example 1 was placed in a 500 mL culture bottle of glass that contains a ½ (macro) MS culture medium (50 mL), such that the PCBs concentration of the medium becomes 10 mg/L. In this PCBs-added culture medium, plantlets of *Atropa belladonna* regenerated from hairy roots were planted and cultivated at a temperature of 25° C. for 3 weeks under illumination for 16 hours and dark for 8 hours. After completion of cultivation, the regenerated plantlets were analyzed by means of GC-MS for the amount of PCBs remaining in the culture medium and the amount of PCBs absorbed and accumulated therein. The results are shown in Table 3.

Example 6

The DMSO solution having a PCBs concentration of 20,000 mg/L as prepared in Example 1 was placed in a 500 mL culture bottle of glass that contains a ½ (macro) MS culture medium (50 mL), such that the PCBs concentration of the medium becomes 10 mg/L. Further, Tween20 (polyoxyethylene sorbitan monolaurate), which is a non-ionic surfactant, was added into the bottle such that the concentration thereof becomes 0.01% by weight. In this PCBs-added culture medium, the plantlets of *Atropa belladonna* regenerated from hairy roots were planted and cultivated for 3 weeks. After completion of cultivation, the regenerated plantlets were analyzed by means of GC-MS for the amount of PCBs remaining in the culture medium and the amount of PCBs absorbed and accumulated therein. The results are shown in Table 3.

Comparative Example 3

Natural *Atropa belladonna* was planted and cultivated for 3 weeks in a manner similar to that of Example 5. After completion of cultivation, the plantlets were analyzed by means of GC-MS for the amount of PCBs remaining in the culture medium and the amount of PCBs absorbed and accumulated therein. The results are shown in Table 3.

TABLE 3

|  | Weight of plant bodies (g) | | Percentage to added PCBs (%) | |
| --- | --- | --- | --- | --- |
|  | Initial | 3-week cultivation | 3-week cultivation | |
|  |  |  | PCBs in medium | PCBs in plant bodies |
| Example 5 | 2.09 | 2.95 | 3.9 | 50.0 |
| Example 6 | 2.05 | 3.04 | 2.2 | 46.7 |
| Com. Example 3 | 2.10 | 2.50 | 10.0 | 70.3 |

As seen from Table 3, the plant bodies of *Atropa belladonna* regenerated from hairy roots absorb and decompose a considerably large amount of PCBs as compared to those of natural *Atropa belladonna*.

Example 7

Absorption and Decomposition of Dioxins by Hairy Roots of *Atropa Belladonna*

(1) Dioxins Reagent

Fly ash in an incineration plant was extracted with toluene. The extract was dissolved in dimethyl sulfoxide (DMSO). The resultant solution was used as a dioxins reagent.

(2) Preliminary Cultivation of Hairy Roots and Subsequent Cultivation in Dioxins-added Culture Medium Graded amounts of a ½ (macro) MS culture medium (100 mL) were placed in a 300 mL Erlenmeyer flask. Hairy roots (0.2 g) chopped into pieces having a length of about 2 cm were placed in the flask and were subjected to 2-week preliminary cultivation in the dark at a temperature of 25° C. while being shaken (100 rpm). The DMSO solution (1 mL) of Idhoxins was placed in another 300 mL Erlenmeyer flask that contains a ½ (macro) MS culture medium (100 mL), such that the dioxins concentration of the medium becomes 1000 pg-TEQ/mL. In this dioxins-added culture medium, the hairy roots which had undergone the above preliminary cultivation were planted to prepare two kinds of samples—one underwent another 1-week cultivation and the other underwent another 3-week cultivation.

(3) Analysis for Dioxins

After completion of cultivation of the hairy roots in the dioxins-added culture medium, the samples were analyzed by means of GC-MS for the amount of dioxins remaining in the culture medium and the amount of dioxins absorbed and accumulated in the hairy roots. The results are shown in Table 4.

Example 8

Hairy roots of *Atropa belladonna* obtained in a manner similar to that of Example 7 were subjected to preliminary cultivation under the same conditions as those in Example 7. The DMSO solution (1 mL) of dioxins mentioned above in Example 7 was placed in another 300 mL Erlenmeyer flask that contains a ½ (macro) MS culture medium (100 mL), such that the dioxins concentration of the medium becomes 1000 pg-TEQ/mL. Lurther, Tween20 (polyoxyethylene sorbitan monolaurate), which is a nonionic surfactant, was added into the flask such that the concentration thereof becomes 0.01% by weight. In this dioxins-added culture medium, the hairy roots which had undergone the above preliminary cultivation were planted to prepare two kinds of samples—one underwent another 1-week cultivation and the other underwent another 3-week cultivation.

After completion of cultivation of the hairy roots in the dioxins-added culture medium, the samples were analyzed by means of GC-MS for the amount of dioxins remaining in the culture medium and the amount of dioxins absorbed and accumulated in the hairy roots. The results are shown in Table 4.

Comparative Example 4

*Atropa belladonna* was sterilely seeded and was cultivated without inoculation of *Agrobacterium rhizogenes*. The resulting seedling roots were chopped into pieces having a length of about 2 cm. The chopped roots (0.2 g) were subjected to preliminary cultivation in a manner similar to that of Example 7. The DMSO solution (1 mL) of dioxins mentioned above in Example 7 was placed in another 300 mL Erlenmeyer flask that contains a ½ (macro) MS culture medium (100 mL), such that the dioxins concentration of the medium becomes 1000 pg-TEQ/mL. In this culture medium, the roots which had undergone the above preliminary cultivation were planted to prepare two kinds of samples—one underwent another 1-week cultivation and the other underwent another 3-week cultivation.

After completion of cultivation of the roots in the dioxins-added culture medium, the samples were analyzed by means of GC-MS for the amount of dioxins remaining in the culture medium and the amount of dioxins absorbed and accumulated in the roots. The results are shown in Table 4.

TABLE 4

| | Percentage to added dioxins (%) | | | |
| --- | --- | --- | --- | --- |
| | 1-week cultivation | | 3-week cultivation | |
| | Dioxins in medium | Dioxins in roots | Dioxins in medium | Dioxins in roots |
| Example 7 | 78 | 13 | 33 | 62 |
| Example 8 | 63 | 28 | 26 | 42 |
| Com. Example 4 | 78 | 14 | 58 | 27 |

As seen from Table 4, the above-mentioned hairy roots absorb and decompose a considerably large amount of dioxdins as compared to the roots of natural *Atropa belladonna*.

Example 9

Granular-red soil (commercially available for gardening use), hard-granular Kanuma soil (commercially available for gardening use), and METROMIX 350 (product of Scotts-Sierra Horticultural Products Company) were mixed in the volume ratios 4:3:3. The resulting mixture was mixed with dry pulverized soil contaminated with high-concentration dioxins, thereby preparing about 1000 pg-TEQ/g of artificial contaminated soil. The artificial contaminated soil (about 2000 g) was placed in a 1/5000a New Wagner Pot (NE-5 type, product of Iuchi Seieido). *Atropa belladonna* regenerated from hairy roots was planted in the soil. Ninety days later, when roots were found to have sufficiently grown inside the pot, the contaminated soil was analyzed for dioxins concentration. The results are shown in Table 5.

Comparative Example 5

Natural *Atropa belladonna* was planted in a manner similar to that of Example 9. The contaminated soil was analyzed for dioxins concentration. The results are shown in Table 5.

Comparative Example 6

The contaminated soil of Example 9 in which no plant was planted was allowed to stand for 90 days. The contaminated soil was analyzed for dioxins concentration. The results are shown in Table 5.

TABLE 5

|  | Dioxins concentration (pg-TEQ/g) |
|---|---|
| Example 9 | 675 |
| Comparative Example 5 | 814 |
| Comparative Example 6 | 918 |

As seen from Table 5, the plant bodies of *Atropa belladonna* regenerated from hairy roots absorb a considerably large amount of dioxins as compared to those of natural *Atropa belladonna*.

What is claimed is:

1. A method of decontaminating a medium containing polychlorinated biphenyls (PCBs) or dioxins with a plant, which comprises:
    a) adding a nonionic surfactant or dimethyl sulfoxide or a combination thereof to the medium containing the PCBs or dioxins or both; and thereafter
    b) bringing the medium containing the PCBs or dioxins or both in contact with hairy roots obtained from introduction of an Ri plasmid from *Agrobacterium rhizogenes* into the plant which absorbs, or absorbs and decomposes the PCBs or dioxins or both;
    wherein the dimethyl sulfoxide or the nonionic surfactant or the combination thereof is added to the medium in an amount of 0.005 to 1.0% by weight; and
    wherein the plant belongs to a genus selected from the group consisting of Solanaceae, Cruciferae, Umbelliferae, Clenopodiaceae, Leguminosae, Compositae and Saxifragaceae.

2. The method of claim 1, wherein said dimethyl sulfoxide is added to the medium.

3. The method of claim 1, wherein said nonionic surfactant is added to the medium.

4. The method of claim 1, wherein a combination of said dimethyl sulfoxide and the said nonionic surfactant is added to the medium.

5. The method of claim 1, wherein the nonionic surfactant is selected from the group consisting of glycerin fatty acid esters, propylene glycol fatty acid esters, sorbitan fatty acid esters, polyoxyethylene sorbitan fatty acid esters, polyoxyethylene sorbitan tetraoleate, polyoxyethylene alkyl ethers, polyoxyethylene polyoxypropylene glycol, polyoxyethylene polyoxypropylene alkyl ethers, polyethylene glycol fatty acid esters, castor oil-modified polyoxyethylene, hardened castor oil-modified polyoxyethylene, polyglycerin fatty acid esters and alkyl glycosides.

6. The method of claim 1, wherein the plant is *Atropa belladonna*.

7. The method of claim 1, wherein the plant is *Brassica juncea* var. *multiceps*.

8. The method of claim 1, wherein the plant is *Brassica junceca* var. *cernua*.

9. The method of claim 1, wherein the plant is *Brassica juncea* var. *rapa*.

10. The method of claim 1, wherein the plant is *Daucus caroia*.

11. The method of claim 1, wherein the amount of nonionic surfactant or dimethyl sulfoxide or combination thereof is from 0.01 to 0.1% by weight.

12. The method of claim 1, wherein the medium is soil.

13. The method of claim 1, wherein the medium is a lake.

14. The method of claim 1, wherein the medium is a marsh.

15. A method of decontaminating a medium containing polychlorinated biphenyls (PCB) or dioxins with a regenerated plantlet, comprising:
    a) adding a nonionic surfactant or dimethyl sulfoxide or a combination thereof to the medium containing the PCBs or dioxins or both; and thereafter
    b) bringing the medium containing the PCBs or dioxins or both into contact with the regenerated plantlet obtained from hairy roots which are obtained from the introduction of Ri plasmid to *Agrobacterilim rhizogenes* to thereby cause the regenerated plantlet to absorb, or absorb and decompose the PCBs or dioxins or both;
    and wherein the dimethyl sulfoxide or the nonionic surfactant or the combination thereof is added to the medium in an amount of 0.01 to 0.1% by weight; and
    wherein the regenerated plantlet belongs to a genus selected from the group consisting of Solanaceae, Cruciferae, Umbelliferae, Chenopodiaceae, Leguminosae, Compositae and Saxifragaceae.

16. The method of claim 15, wherein said dimethyl sulfoxide is added to the medium.

17. The method of claim 15, wherein said nonionic surfactant is added to the medium.

18. The method of claim 15, wherein a combination of said dimethyl sulfoxide and said nonionic surfactant is added to the medium.

19. The method of claim 17, wherein the nonionic surfactant is selected from the group consisting of glycerin fatty acid esters, propylene glycol fatty acid esters, sorbitan fatty acid esters, polyoxyethylene sorbitan fatty acid esters, polyoxyethylene sorbitan tetraoleate, polyoxyethylene alkyl ethers, polyoxyethylene polyoxypropylene glycol, polyoxyethylene polyoxypropylene alkyl ethers, polyethylene glycol fatty acid esters, castor oil-modified polyoxyethylene, hardened castor oil-modified polyoxyethylene, polyglycerin fatty acid esters and alklyl glycosides.

20. The method of claim 15, wherein the plantlet is *Atropa belladotilia*.

21. The method of claim 15, wherein the plantlet is *Brassica juncea* var. *multiceps*.

22. The method of claim 15, wherein the plantlet is *Brassica juncea* var. *cernua*.

23. The method of claim 15, wherein the plantlet is *Brassica juncea* var. *rapa*.

24. The method of claim 15, wherein the plantlet is *Daucus carota*.

25. The method of claim 15, wherein the medium is soil.

26. The method of claim 15, wherein the medium is a lake.

27. The method of claim 15, wherein the medium is a marsh.

* * * * *

UNITED STATES PATENT AND TRADEMARK OFFICE
CERTIFICATE OF CORRECTION

PATENT NO. : 6,303,844 B1  
DATED : October 16, 2001  
INVENTOR(S) : Masatoshi Morita et al.

It is certified that error appears in the above-identified patent and that said Letters Patent is hereby corrected as shown below:

Column 11,  
Line 36, "Clenopodiaceae" should read -- Chenopodiaceae --.

Signed and Sealed this

Fourteenth Day of May, 2002

*Attest:*

JAMES E. ROGAN  
*Attesting Officer*   *Director of the United States Patent and Trademark Office*